United States Patent
Thomson et al.

(10) Patent No.: US 9,850,340 B2
(45) Date of Patent: Dec. 26, 2017

(54) APOPINENE AS A BIORENEWABLE MONOMER FOR RING-OPENING METATHESIS POLYMERIZATION

(71) Applicant: Northwestern University, Evanston, IL (US)

(72) Inventors: Regan J. Thomson, Chicago, IL (US); Benjamin F. Strick, Wausau, WI (US); Franz M. Geiger, Evanston, IL (US); Massimiliano Delferro, Chicago, IL (US)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 15/289,686

(22) Filed: Oct. 10, 2016

(65) Prior Publication Data

US 2017/0101488 A1    Apr. 13, 2017

Related U.S. Application Data

(60) Provisional application No. 62/239,056, filed on Oct. 8, 2015.

(51) Int. Cl.
*C08G 61/00* (2006.01)
*C08G 61/08* (2006.01)
*C08G 61/06* (2006.01)

(52) U.S. Cl.
CPC .............. *C08G 61/08* (2013.01); *C08G 61/06* (2013.01)

(58) Field of Classification Search
CPC .................................. C08G 61/08; C08G 61/06
See application file for complete search history.

(56) References Cited

U.S. PATENT DOCUMENTS

| 3,313,865 A | 4/1967 | Vohwinkel |
| 2012/0213727 A1 | 8/2012 | Hazan |

FOREIGN PATENT DOCUMENTS

| GB | 1370189 | 10/1974 | |
| JP | 56-29502 A | * 3/1981 | ............ A01N 37/02 |
| WO | 9940049 A1 | 8/1999 | |
| WO | 2009007767 A1 | 1/2009 | |

OTHER PUBLICATIONS

Strick, B.F.; Delferro, M.; Geiger, F.M.; Thomson, R.J. ACS Sustainable Chem. Eng. 2015, 3, 1278-1281 (Jun. 24, 2015).*

Pangborn A., et al., "Safe and Convenient Procedure for Solvent Purification", Organometallics 1996, 15, 1518-1520.

Fomine, S. et al, "Metathesis Transformations of Terpenes. Computational Modeling of (-)-α-Pinene Ring Opening by Ruthenium and Tungsten Carbene Catalysts", J. Organomet. Chem. 2012, 701, 68-74.

Ipatieff, V. N. et al., "Study in Terpene Series. XI. The Dehydroxymethylation of Bicyclic Primary Terpenic Alcohols by Hydrogenolysis in the Presence of Nickel Catalysts", J. Am. Chem. Soc., 1951, 73, 4098-4101.

(Continued)

*Primary Examiner* — Rip A Lee
(74) *Attorney, Agent, or Firm* — Reinhart Boerner Van Deuren s.c.

(57) ABSTRACT

Ring-opening metathesis polymerization of apopinene and related functionalized monomers and corresponding polymer products.

31 Claims, 9 Drawing Sheets

(56) References Cited

OTHER PUBLICATIONS

Eschinazi, H. et al., "Study in the Terpene Series. XXXI. Synthesis of Appinene by Catalytic Decarbonylation of Myrtenal" J. Org. Chem. 1959, 24, 1369.
Grubbs, R.H. et al, "A Practical and Highly Active Ruthenium-Based Catalyst that Effects the Cross Metathesis of Acrylonitrile", Angew. Chem. Int. Ed., 2002, 41, 4035-4037.
Barton, D. H. R. et al., "Radical Chemistry Based on (+)-cis-Pinononic and (+)-CIS-Pinonic Acids", Synth. Commun. 1996, 26, 1953-1968.
Moglioni, A. G. et al., "Divergent Routes to Chiral Cyclobutane Synthons from (−)-alpha-Pinene and Their Use in the Stereoselective Synthesis of Dehydro Amino Acids", J. Org. Chem. 2000, 65, 3934-3940.
Cacchi, S. et al., "Palladium-Catalyzed Reduction of Vinyl Trifluoromethanesulfonates to Alkenes: Cholesta-3,5-Diene", Org. Synth. 1990, 68, 138-147.
Van Den Berg, R.J. B. H. N. et al., "A simple and low cost synthesis of D-erythro-sphingosine and D-erythro-azidosphingosine from D-ribo-phytosphingosine: glycosphingolipid precursors", Tetrahedron Lett. 2002, 43, 8409-8412.
Martinez, A. et al., "Metathesis Transformations of Natural Products: Cross-Metathesis of Natural Rubber and Mandarin Oil by Ru-Alkylidene Catalysts", Molecules 2012, 17, 6001-6010.

\* cited by examiner

Figure 1A A. 16 standard
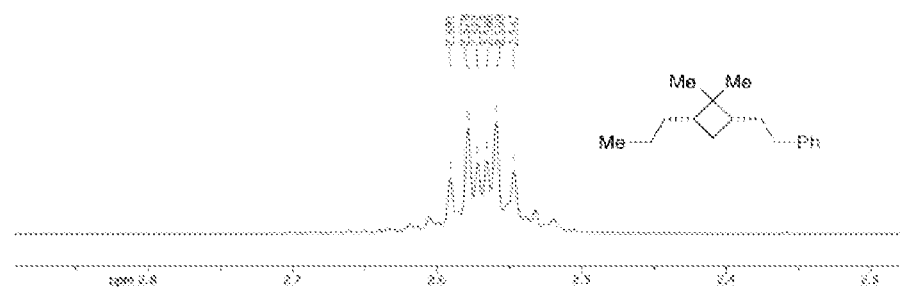
Figure 1B B. Cross metathesis mixture
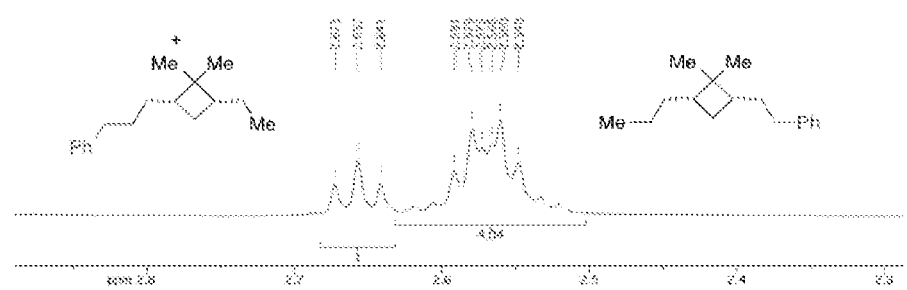
Figure 1C C. 17 standard
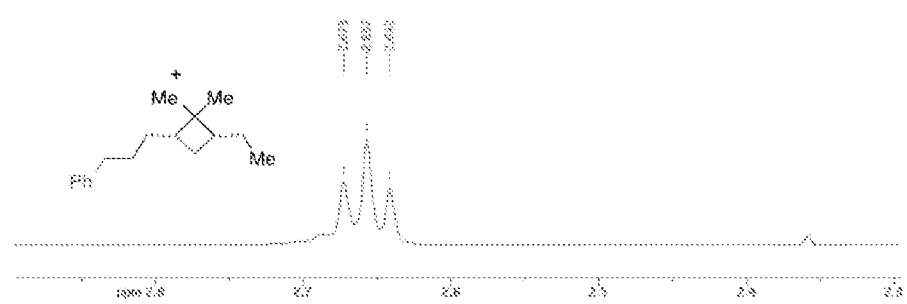

and combinations thereof
where R = alkyl or aryl

APOPINENE AS A BIORENEWABLE MONOMER FOR RING-OPENING METATHESIS POLYMERIZATION

This application claims priority to and the benefit of application Ser. No. 62/239,056 filed Oct. 8, 2015, the entirety of which is incorporated herein by reference.

This invention was made with government support under CHE1212692 awarded by the National Science Foundation. The government has certain rights in the invention.

BACKGROUND OF THE INVENTION

α-Pinene (1) is the most abundant monoterpene present in nature and plays crucial roles in many biological, atmospheric and industrial processes. Similar to many other readily accessed and biorenewable terpenes, α-pinene is widely used in both the fine chemical and polymer industries. More specifically, the Lewis acid-catalyzed polymerization of α-pinene (1), which generates polymer 2 (FIG. 8), has found a variety of uses in a plethora of industrial applications such as adhesives, plastics, and rubbers.

The high abundance, low cost, and biorenewability of α-pinene make its incorporation into additional novel materials highly desirable from the standpoint of sustainability. One avenue that has sparked some theoretical interest is the ring-opening metathesis polymerization (ROMP) of α-pinene (1). (Fomine, S.; Tlenkopatchev, M. A. Metathesis Transformations of Terpenes. Computational Modeling of (−)-α-Pinene Ring Opening by Ruthenium and Tungsten Carbene Catalysts. *J. Organomet. Chem.* 2012, 701, 68-74.) Unfortunately, it appears there have been no reports of α-pinene (1) participating in ROMP and, therefore, no polymers of this type (i.e., 3) are known. One factor believed contributing to the inability of α-pinene (1) to engage in ROMP is its highly congested trisubstituted olefin that likely hampers polymer initiation (and propagation).

SUMMARY OF THE INVENTION

In light of the foregoing, it can be an object of the present invention to provide various pinene-related monomers and related polymers, thereby overcoming various deficiencies and shortcomings of the prior art, including those outlined above. It will be understood by those skilled in the art that one or more aspects of this invention can meet certain objectives, while one or more other aspects can meet certain other objectives. Each objective may not apply equally, in all its respects, to every aspect of this invention. As such, the following objects can be viewed in the alternative with respect to any one aspect of this invention.

It can be an object of the present invention to provide one or more pinene derivatives useful in ROMP reactions.

It can be another object of the present invention to provide metathesis reaction catalysts and/or reaction conditions promoting ROMP of such pinene derivatives.

It can be another object of this invention, alone or in conjunction with one or more of the preceding objectives, to provide corresponding polymers, as can be further transformed, for specific-desired end-use application.

Other objects, features, benefits and advantages of the present invention will be apparent from this summary and the following descriptions of various preferred embodiments, and will be readily apparent to those skilled in the art having knowledge of ROMP techniques and resulting polymers. Such objects, features, benefits and advantages will be apparent from the above as taken into conjunction with the accompanying examples, data, figures and all reasonable inferences to be drawn therefrom, alone or with consideration of the references incorporated herein.

In part, the present invention can be directed to a method of using a pinene derivative for ring-opening metathesis polymerization. Such a method can comprise providing starting material comprising an apopinene monomeric component; and reacting such a material with a metathesis catalyst component under conditions of the sort described herein and promoting ring-opening metathesis polymerization of such a starting material. In certain embodiments, without limitation, the metal center of such a catalyst compound can be selected from Re, Ru, Mo and W. In certain such embodiments, such a catalyst component can be selected from Ru-based Grubbs catalysts. Without limitation, polymerization can be achieved using a Grubbs III catalyst. In certain such embodiments, polymerization can be performed in a solvent such as but not limited to benzene, dichloromethane and tetrahydrofuran. In certain embodiments, such an apopinene monomer component can be selected from apopinene and apopinene comprising an allylic functional group, wherein such a functional group can be selected from OH, and RC(O)O, where R can be selected from but not limited to alkyl, substituted alkyl, aryl and substituted aryl moieties, and such substituents can be selected from hydroxy, amino, halo, $C_1$-$C_6$ alkyl and $C_1$-$C_6$ alkoxy substituents and combinations thereof. In certain such embodiments, R can be selected from $C_1$-$C_6$ alkyl and phenyl moieties. Optionally, further reaction of a resulting polyalkene product can provide a cross-linked, hydrogenated or functionalized polymer. Regardless, apopinene can be prepared from either α-pinene or myrtenal.

In part, the present invention can also be directed to a method of preparing a polymer of apopinene. Such a method can comprise providing a fluid medium comprising an apopinene monomeric component; contacting such a medium with metathesis catalyst component including but not limited to a Grubbs III catalyst; and reacting such a monomeric component with such a catalyst under conditions promoting ring-opening metathesis polymerization to provide a polyalkene product. As discussed above and illustrated below, such a catalyst and polymerization can be provided in a solvent such as tetrahydrofuran. In certain such embodiments, reaction conditions and/or choice of catalyst can provide a polyalkene product of all trans-configured carbon-carbon double bonds.

In part, the present invention can also be directed to a polymer comprising a ring-opening metathesis polymerization product of an apopinene monomeric component, such a metathesis product as can comprise cis-configured monomeric linkages, trans-configured monomeric linkages and combinations of such linkages. Regardless, the molecular weight of such a polymer can be about 1,100 to about 15,600 g/mol.

In certain embodiments, such an apopinene monomer component can be selected from apopinene and apopinene comprising an allylic functional group, wherein such a functional group can be selected from OH, and RC(O)O, where R can be selected from but not limited to alkyl, substituted alkyl, aryl and substituted aryl moieties, and such substituents can be selected from hydroxy, amino, halo, $C_1$-$C_6$ alkyl and $C_1$-$C_6$ alkoxy substituents and combinations thereof. In certain such embodiments, R can be selected from $C_1$-$C_6$ alkyl and phenyl moieties. Optionally, further reaction of a resulting polyalkene product can provide a cross-linked, hydrogenated or functionalized polymer.

More specifically, the present invention can also be directed to a polymer of a formula

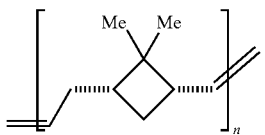

wherein n can be an integer up to about 125 or more. As discussed above, and illustrated below, such a polymer can be of a corresponding molecular weight.

BRIEF DESCRIPTION OF THE DRAWINGS

FIGS. 1A-C. $^1$H NMR spectrum of the benzylic protons of the cross metathesis reduction product (1B) compared to the individual $^1$H NMR spectra of synthesized cross metathesis standards (1A and 1C).

FIG. 2 shows how complicated the polymer structure can become. After just two metathesis iterations there are ten potential combinations having a unique structure. The relative abundance of these combination patterns is dependent on the selectivity of the reaction between the terminal carbene with apopinene (4) and is likely a complicated mixture (as seen by the challenging $^{13}$C-NMR spectrum).

DETAILED DESCRIPTION OF CERTAIN EMBODIMENTS

Figure 8:
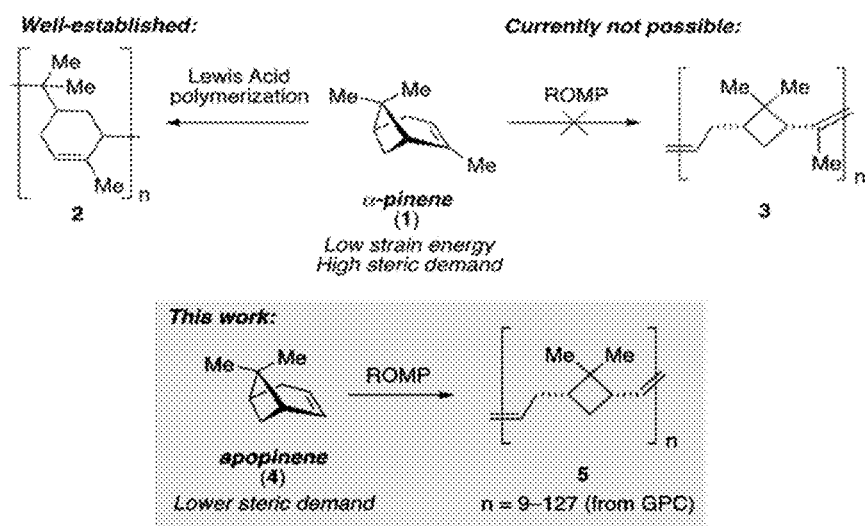
FIG. 8. Prior art polymerization of α-pinene (1) and contrast with an embodiment of the present invention.

As relates to certain non-limiting embodiments of this invention, a way to circumvent problems of the prior art would be to alter the pinene substrate by deleting the vinylic methyl substituent, resulting in the less sterically congested precursor, apopinene (4) for preparation of ROMP products. It was thought that the reduced steric hindrance within 4 would facilitate initiation and polymerization with ROMP catalysts, provided that moderate strain energy was not a factor. In the literature, it was reported that α-pinene (1) has a calculated strain enthalpy of 5.81 kcal·mol$^{-1}$, which is significantly lower than that of the mainstay for ROMP, norbornene (23.9 kcal·mol$^{-1}$), providing another reason for its lack of ROMP activity. As part of this invention (FIG. 8), a similar calculation for the homodesmic reaction of apopinene (4) with ethylene and found a strain enthalpy of 8.1 kcal·mol$^{-1}$ (α-pinene (1) afforded a value of 4.6 kcal·mol$^{-1}$ under the same conditions, in good agreement with the literature).

Apopinene (4) can be accessed from naturally abundant and inexpensive α-pinene (1) by an initial allylic oxidation of 1 to myrtenal (6) using selenium dioxide, followed by a palladium-catalyzed decarbonylation (Scheme 1). (Contemporaneous with this invention, (~)-α-pinene was available from Sigma-Aldrich in 20 kg drums for $447, and 1 kg quantities for $60. (+)-α-Pinene was also available. (−)-Myrtenal was $523 for 1 kg from Sigma-Aldrich.) (Relating to the synthesis, see Ipatieff, V. N.; Czajkowski, Pines, H. Study in Terpene Series. XI. The Dehydroxymethylation of Bicyclic Primary Terpenic Alcohols by Hydrogenolysis in the Presence of Nickel Catalysts. J. Am. Chem. Soc., 1951, 73, 4098-4101; and Eschinazi, H.; Pines, H. Study in the Terpene Series. XXXI. Synthesis of Appinene by Catalytic Decarbonylation of Myrtenal. J. Org. Chem. 1959, 24, 1369.) Myrtenal (6) itself is also a naturally occurring and sustainable feedstock chemical, and so commercially available (−)-myrtenal (6) was utilized as a more convenient direct precursor to (−)-apopinene (4). Thus, apopinene (4) represents a potentially useful monomer for incorporation into sustainable polymers.

Scheme 1. Synthesis of Apopinene (4) from Biorenewable Precursors.

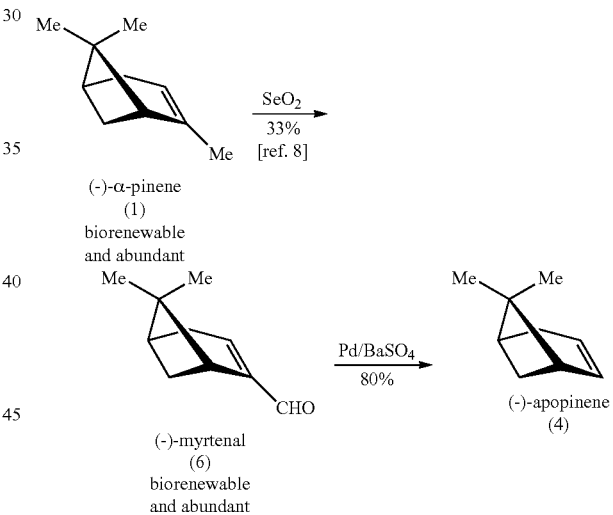

Figure 2:
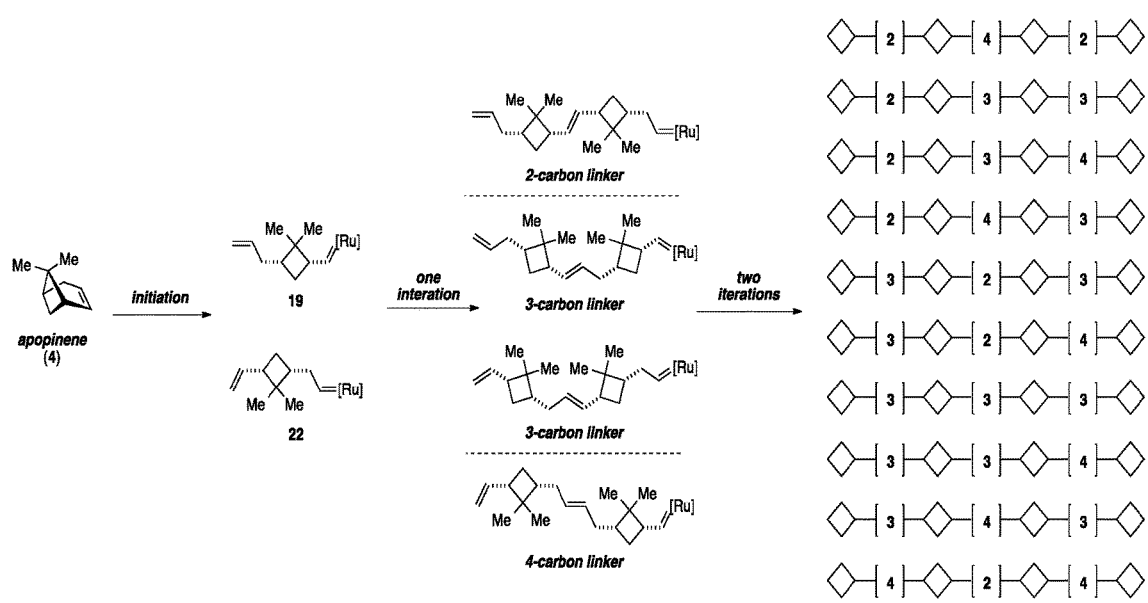
FIG. 2. Initiation of ROMP for apopinene (4) can occur at either of two positions to give carbenes 19 and 22. One metathesis iteration potentially leads to four active carbenes, containing 2-, 3-, and 4-carbon linkers between the cyclobutane core.
Figure 3:
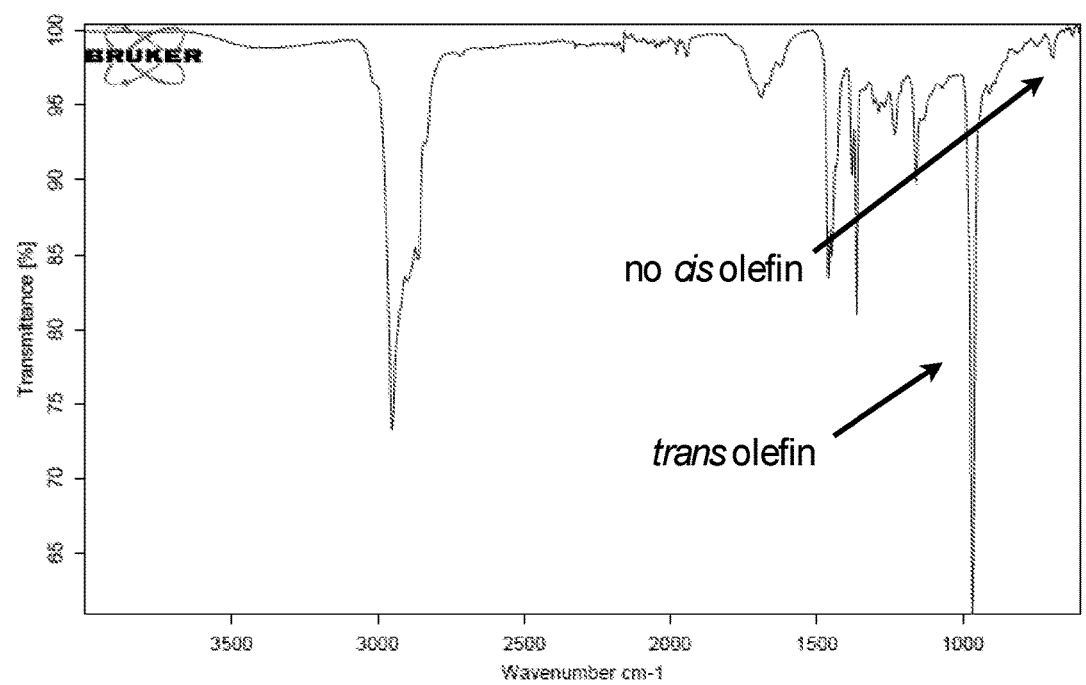
FIG. 3. FT-IR spectrum of ROMP apopinene product obtained with Grubbs $2^{nd}$ generation catalyst in THF (1 h, RT).

Contrary to norbornene, the ROMP of apopinene is complicated by its asymmetry, leading to the potential for different head-tail combinations within the formed polymer (see FIG. 2). While significant effort has been put towards developing catalysts that provide high tacticity and stereoregular polymers within other systems, it was unclear at the outset how apopinene would behave in this regard. For the purpose of this study, the focus was on the readily available ruthenium-based catalysts, which maintain high reactivity rates and exhibit low air sensitivity. Initial attempts to polymerize apopinene (4) using noble metals, such as RuCl$_3$ and ReCl$_5$, showed no signs of initiation at room temperature, while heating of these mixtures led to intractable mixtures. Switching to Grubbs-type catalysts, however, produced the desired ROMP-based polymer with varying yields (Table 1). The resulting polymers were broad and monomodal, but contained high variability in connectivity patterns due to head-tail asymmetry, as determined by $^{13}$C NMR spectroscopy. Unfortunately, the predominantly trans metathesis polymers (determined by IR spectroscopy) generated from Grubbs II (7), Grubbs I (8), and Hoveyda-Grubbs II (9) had low molecular weights (ranging from 1100 to 2500 g·mol$^{-1}$) and high polydispersity indices (PDIs), indicating that propagation occurs more rapidly than initiation (Table 1). $^1$H NMR spectra of all these polymers indicated only trace signals derived from terminal end-group alkenes, indicating that back-biting to form cyclic polymers was likely occurring to a significant degree. Grubbs II (7) consistently produced solid, film-like polymers with the lowest PDIs (Table 1, entries 1-4 and FIG. 3), whereas polymers formed from both Grubbs I (8) and Hoveyda-Grubbs II (9) maintained a gelatinous consistency with higher PDIs (Table 1, entries 5 and 6). Extending reaction times from 1 hour to 18 hours led to no improvement (Table 1, entries 8-9). All three of these catalysts produced polymers roughly 9-20 units in length as determined by GPC, with the second-generation catalysts being generally more active and well-behaved.

TABLE 1

Ring-Opening Metathesis Polymerization of Apopinene (4).

[reaction scheme: (-)-apopinene (4) → [see Table], room temperature → polymer 5]

| entry | Catalyst | mol % | time (h) | Solvent | Concentration (M) | yield (%)$^a$ | PDI$^b$ | Mn$^b$ |
|---|---|---|---|---|---|---|---|---|
| 1 | Grubbs II (7) | 1.0 | 1.0 | DCM | 0.5 | 71 | 2.4 | 2500 |
| 2 | Grubbs II (7) | 1.0 | 1.0 | Benzene | 0.5 | quant. | 2.7 | 1200 |
| 3 | Grubbs II (7) | 1.0 | 1.0 | THF | 0.5 | quant. | 1.6 | 1400 |
| 4 | Grubbs II (7) | 1.0 | 1.0 | THF | 1.0 | 97 | 2.3 | 1400 |
| 5 | Grubbs I (8) | 1.0 | 1.0 | THF | 1.0 | trace | — | — |
| 6 | Hoveyda-Grubbs II (9) | 1.0 | 1.0 | THF | 1.0 | 94 | 2.7 | 1100 |
| 7 | Grubbs II (7) | 0.5 | 18 | THF | 0.25 | 80 | 1.9 | 1400 |
| 8 | Grubbs I (8) | 0.5 | 18 | THF | 0.25 | 62 | 3.5 | 2300 |
| 9 | Hoveyda-Grubbs II (9) | 0.5 | 18 | THF | 0.25 | 54 | 4.5 | 1400 |
| 10 | Grubbs III (10) | 1.0 | 1.0 | DCM | 0.5 | 57 | 1.6 | 15600 |
| 11 | Grubbs III (10) | 1.0 | 1.0 | THF | 0.5 | 94 | 2.1 | 15600 |
| 12 | (11)$^c$ | 0.5 | 6 | DCM | 0.5 | 0 | — | — |
| 13 | (12)$^c$ | 1.0 | 6 | THF | 0.5 | 0 | — | — |

$^a$Isolated yields.
$^b$Determined by gel permeation chromatography (GPC).
$^c$Reactions were also repeated at reflux.

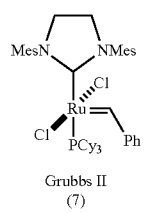

Grubbs II
(7)

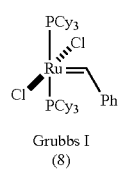

Grubbs I
(8)

TABLE 1-continued

Ring-Opening Metathesis Polymerization of Apopinene (4).

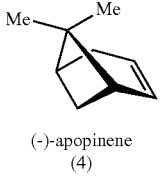

| entry | Catalyst | mol % | time (h) | Solvent | Concentration (M) | yield (%)[a] | PDI[b] | Mn[b] |
| --- | --- | --- | --- | --- | --- | --- | --- | --- |

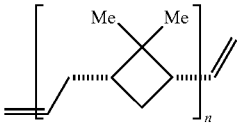

Hoveyda-Grubbs II
(9)

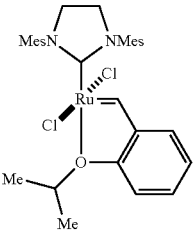

Grubbs III
(10)

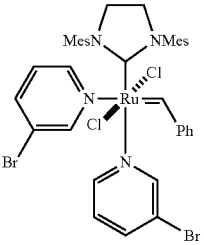

11

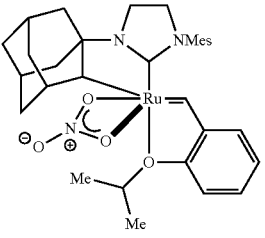

12

A significant improvement in polymerization was found when the fast initiating third-generation Grubbs III catalyst 10 was utilized (Table 1, entries 10 and 11). While conversion after one hour in DCM was modest, the resulting polymer had a molecular weight of 15,600 g·mol$^{-1}$ and a PDI of 1.6 (Table 1, entry 10). Changing solvents to THF led to an improved 94% isolated yield of polymer without sacrificing molecular weight, although the PDI increased to 2.1 (Table 1, entry 11). Similar to the results obtained using Grubbs II (7), the polymer generated using Grubbs III (10) contained only trans-alkenes and showed only trace signs of terminal alkenes. In an attempt to generate a predominantly cis configured polymer, Z-selective olefin metathesis catalysts 11 and 12, were employed (Table 1, entries 12 and 13). These catalysts, although viable for the polymerization of norbornene, failed to initiate with less strained apopinene (4), even at elevated temperatures (reflux in DCM or THF). Ultimately, the results outlined in Table 1 show that a high molecular weight all trans-polymer consisting of approximately 127 monomer units can be rapidly generated in high yield from apopinene (4) using the Grubbs III catalyst 10, establishing apopinene (4) as a potentially viable sustainable monomer for polymer synthesis. In contrast, treatment of α-pinene (1) with Grubbs III (10) led to no productive polymer formation.

Because polymer 5 consists of only trans olefins, the multiple olefinic signals in the $^{13}$C NMR spectrum are most likely a result of incomplete head-to-tail selectivity during initiation and subsequent propagation steps. Unfortunately, these peaks occur at similar chemical shifts, making it challenging to assign or integrate them effectively. In order to help determine the selectivity of initiation, and to gain insight into the inherent regioselectivity that 4 displays towards Ru-carbene complexes, a ring-opening cross metathesis experiment (Scheme 2) between apopinene (4) and styrene (13) was performed.

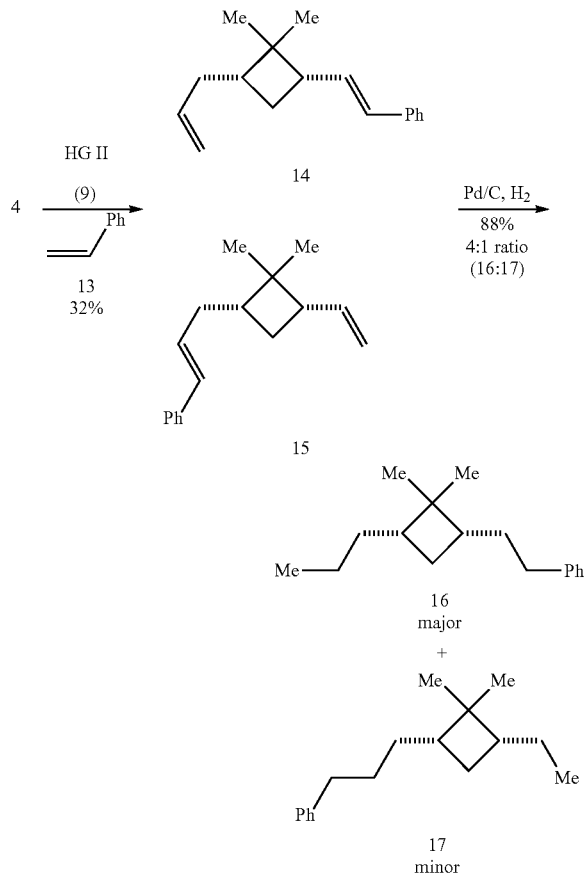

Scheme 2. Ring-opening cross metathesis of apopinene (4).

Treatment of apopinene (4) with Hoveyda-Grubbs II (9) in the presence of excess styrene (14) could potentially produce a mixture of regio- and stereoisomers. In the event, ring-opening cross metathesis of 4 gave rise to a mixture of alkene products in 32% yield whose composition was initially difficult to interpret, although the major isomers appeared to be trans configured. (The low yield is a result of quenching the reaction early to avoid further cross metathesis reactions.) Reduction of this mixture with palladium on carbon, however, produced a mixture of two major products with a simplified $^1$H NMR spectrum (FIG. 1B). Comparison of this spectrum to those of independently synthesized standards of 16 and 17 (FIGS. 1A and 1C, respectively) showed clearly that 16 and 17 were produced in a 4:1 ratio through the ring-opening cross metathesis route (i.e., Scheme 2). Thus, it was established that the initial products of this ring-opening cross metathesis were alkenes 14 (major) and 15 (minor).

Figure 9:
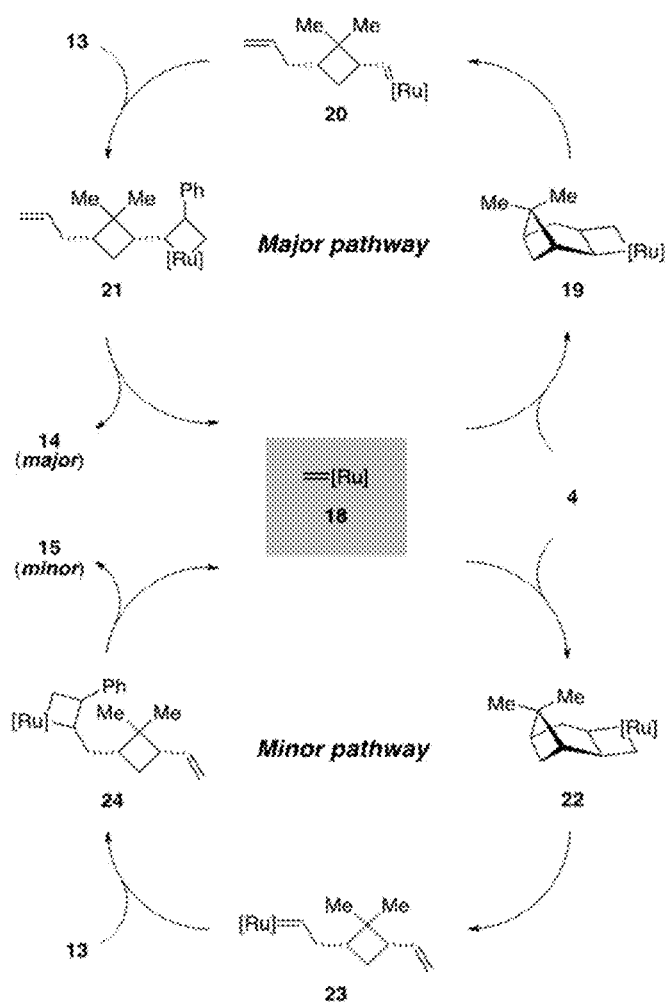
FIG. 9. Proposed catalytic cycle.

Taken together, these results support that initiation of metathesis with active catalyst 18 places the ruthenium metal center on the carbon adjacent to the cyclobutane within 4 to give metallocyclobutanes 19 and 22 in a 4:1 ratio, respectively (FIG. 9). Without limitation to any one theory or mode of operation, ring opening then leads to carbene 20 (from 19) or to carbene 23 (from 22). Reaction of each of these species with styrene (13) then leads to the two products 14 and 15, as described above.

Reported computational studies of the ROMP of α-pinene (1) predict that the metal center prefers to initiate at the more sterically hindered position, resulting in the disubstituted metallacarbene analogous to monosubstituted metallacarbene 20 (FIG. 9). Despite their structural and electronic differences, the present experimental results for apopinene (4) show that initiation displays the same regioselectivity as that predicted for α-pinene (1).

While the selectivity observed in this cross metathesis experiment provides some insight into the initiation step of this ROMP process, it is more difficult to provide information regarding the propagation steps. Again, without limitation, it can be assumed that the regioselectivity of addition of carbenes 20 and 23 to apopinene (4) during polymer chain growth also proceeds with the same intrinsic selectivity, thus leading to the complex mixture of polymers observed. Based on characteristics exhibited by these polymers, the present invention shows for the first time that apopinene (4) can act as a monomer for pinene-derived ROMP processes to yield polymers with molecular weights up to 15600 g·mol$^{-1}$.

Figure 4:
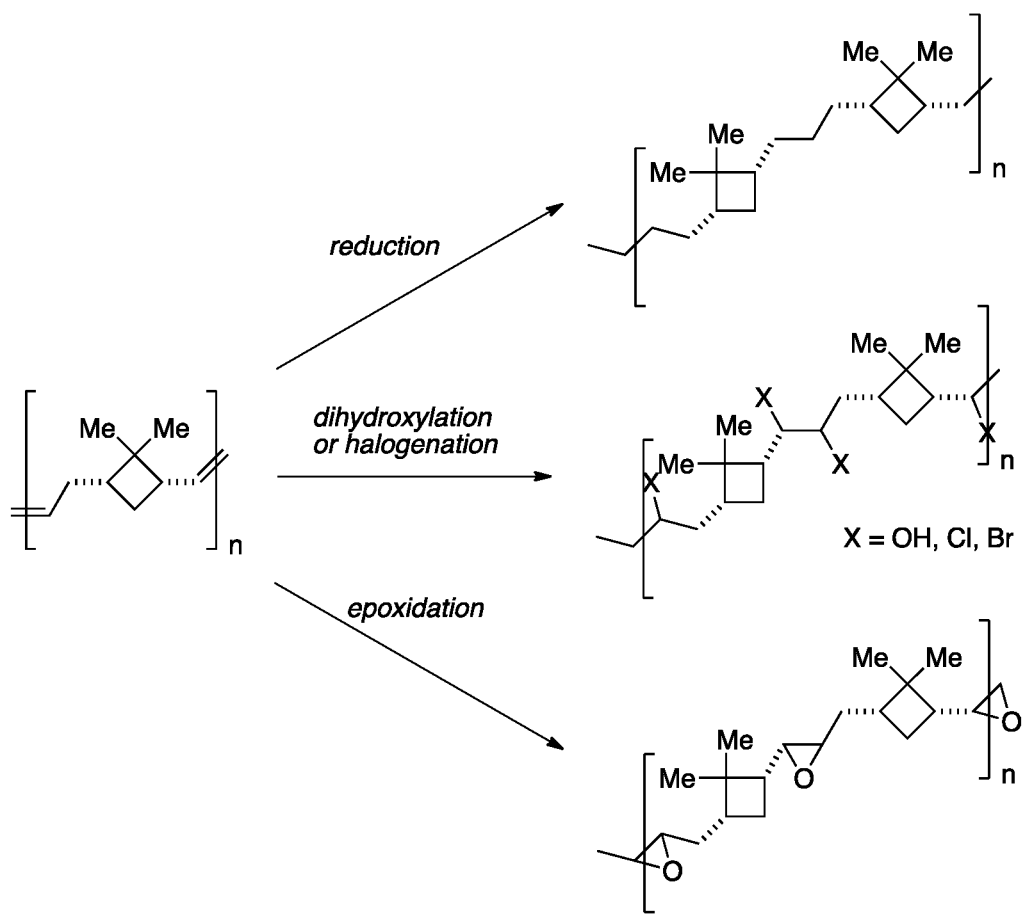
FIG. 4. Examples of post-polymerization functionalization, in accordance with certain non-limiting embodiments of this invention.

As can relate to certain other non-limiting embodiments of this invention, including any of those discussed above, the polymer-derived from the ROMP of apopinene provides opportunities for further functionalization due to the presence of the alkene and cyclobutane substructures within the new polymer backbone. For example, without limitation, reduction, dihydroxylation, halogenation, and epoxidation provide access to new polymers based at least in part on apopinene (See, e.g., FIG. 4). Other transformations would be understood by those skilled in the art and are limited only by reactivity of the alkene moiety, reagent availability and end-use of the resulting polymer.

Figure 5:
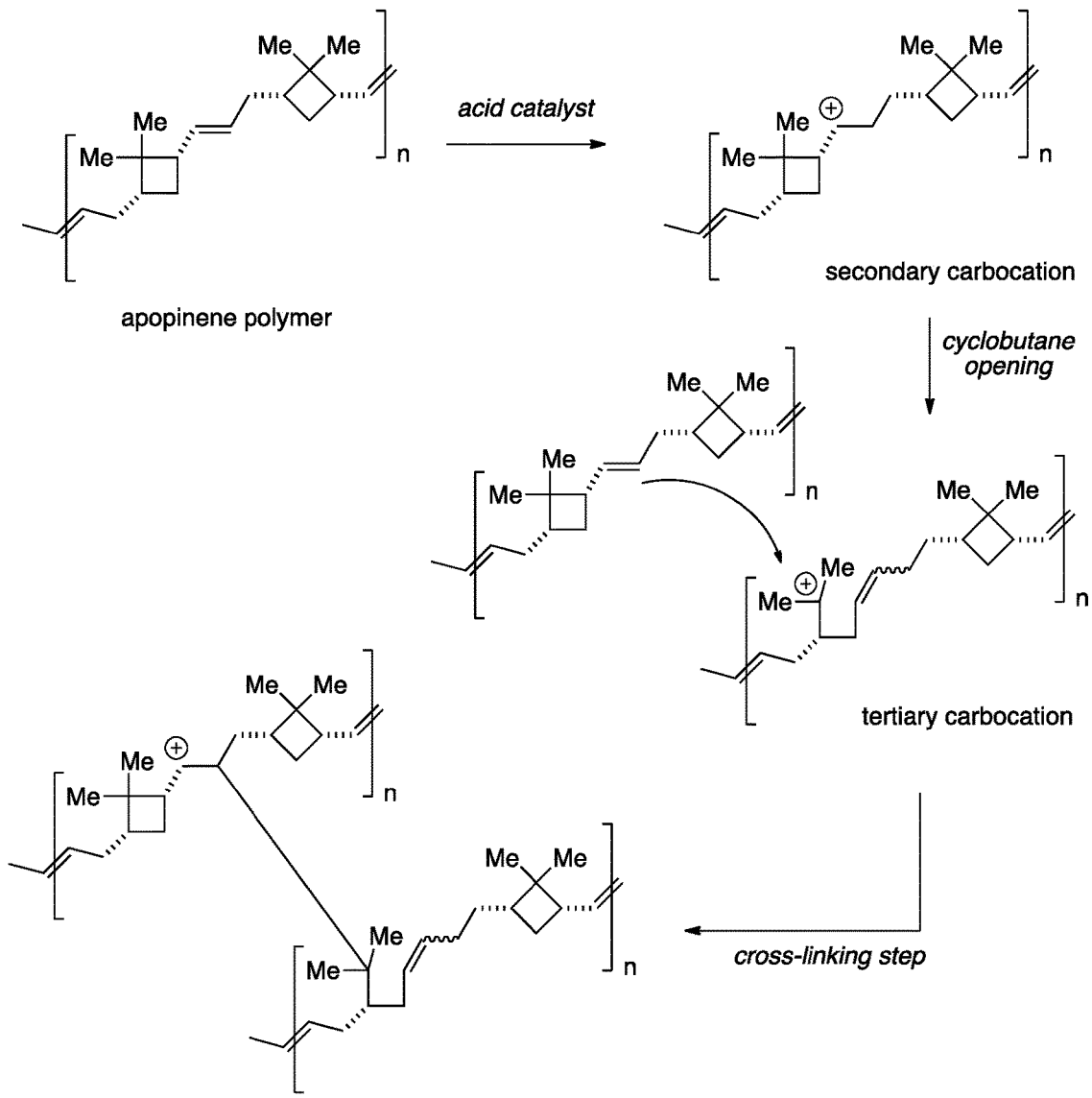
FIG. 5. Schematic illustration of post-polymerization cross-linking, in accordance with certain non-limiting embodiments of this invention.

An inherent structural aspect of the ROMP polymer derived from apopinene is the interesting cyclobutane ring adjacent to an alkene moiety. This relationship creates further opportunities for post-polymerization modification. For example, without limitation to any one theory or mode of operation, treatment of the polymer with an acid catalyst generates a carbocation that can fragment to open the cyclobutane ring, forming a tertiary carbocation. This cation can be intercepted by the alkene moiety of another polymer chain, thereby cross-linking the original polymer. This process is shown schematically in FIG. 5.

Figure 6:
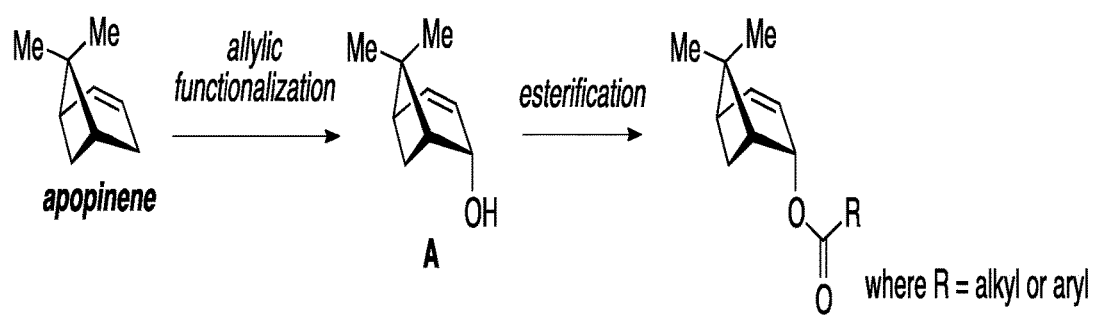
FIG. 6. Non-limiting example of an apopinene derivative for use as a ROMP monomer.
Figure 7:
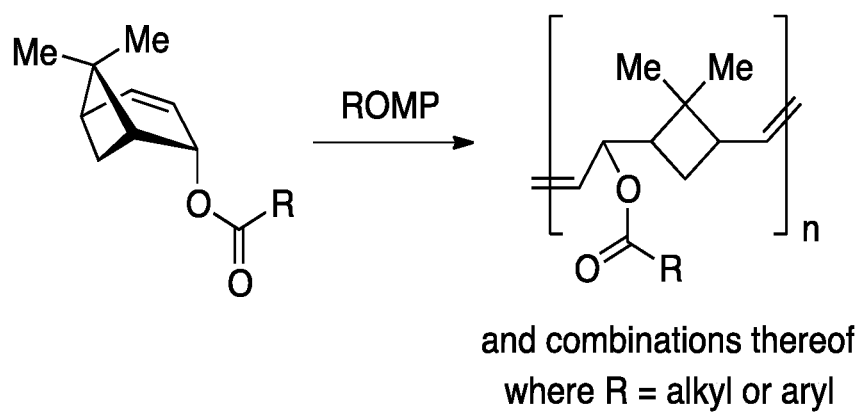
FIG. 7. ROMP of a functionalized apopinene monomer, such a monomer as can also be utilized in, optionally, a post-polymerization transformation.

As can relate to certain other non-limiting embodiments of this invention, including any one or more of those discussed above, apopinene can be derivatized prior to reaction, to provide a range of functionalized monomers. Such derivatives of apopinene then provide access to new ROMP monomers with functional groups useful for preparing new polymer structures. For example, allylic oxidation of apopinene allows for the preparation of substrate A, that may be further derivatized using standard esterification reactions (with acid RC(O)OH) as shown in FIG. 6. Other functional groups can be introduced to the apopinene monomer and are limited only by apopinene reactivity and reagent availability. Using such monomers in a subsequent ROMP process will produce novel polymers with functional groups available for further transformation. A specific example of one such monomer is shown in FIG. 7.

EXAMPLES OF THE INVENTION

The following non-limiting examples and data illustrate various aspects and features relating to the monomers, polymers and/or methods of the present invention, including apopinene and monomers and corresponding polymers, as are available through the ROMP methodologies described herein. In comparison with the prior art, the present monomers, polymers and methods provide results and data which are surprising, unexpected and contrary thereto. While the utility of this invention is illustrated through the preparation of several polymers and monomeric components and related functional groups or moieties which can be incorporated therein, it will be understood by those skilled in the art that comparable results are obtainable with various other polymers and monomeric components/functional groups/moieties, as are commensurate with the scope of this invention.

General Methods.

All reactions were carried out under a nitrogen atmosphere in flame-dried glassware with magnetic stirring unless otherwise stated. THF, Et$_2$O and CH$_2$Cl$_2$ were purified by passage through a bed of activated alumina. (Pangborn, A. B.; Giardello, M. A.; Grubbs, R. H.; Rosen, R. K.; Timmers, F. J., *Organometallics* 1996, 15, 1518-1520.) Reagents were purified prior to use unless otherwise stated following the guidelines of Armarego and Chai. (Armarego, W. L. F.; Chai, C. L. L., *Purification of Laboratory Chemicals*, 5th Ed., Butterworth-Heinemann, 2003.) Purification of reaction products was carried out by flash chromatography using EM Reagent silica gel 60 (230-400 mesh). Analytical thin layer chromatography was performed on EM Reagent 0.25 mm silica gel 60-F plates. Visualization was accomplished with UV light and anisaldehyde stain, or ceric ammonium molybdate stain followed by heating. Film infrared spectra were recorded using a Bruker Tensor ATR. $^1$H-NMR spectra were recorded on a Bruker Avance III 500 (500 MHz) or Varian Inova 400 (400 MHz) spectrometer and are reported in ppm using tetramethylsilane or solvent as an internal standard (CDCl$_3$ at 7.26 ppm). Data are reported as (app=apparent, obs=obscured, s=singlet, d=doublet, t=triplet, q=quartet, p=pentet, h=hextet, sep=septet, o=octet, m=multiplet, b=broad; coupling constant(s) in Hz; integration. Proton-decoupled $^{13}$C-NMR spectra were recorded on a Bruker Avance III 500 (500 MHz) spectrometer and are reported in ppm using solvent as an internal standard (CDCl$_3$ at 77.00 ppm). $^1$H and $^{13}$C NMR assays of polymer microstructure were conducted in CDCl$_3$ at 100° C. with a delay time (d1)=10 sec. Mass spectra data were obtained on an Agilent 6210 Time-of-Flight LC/MS and a Thermo Finnegan Mat 900 XL High Resolution Magnetic Sector. Gel permeation chromatography (GPC) was carried out in 1,2,4-trichlorobenzene (stabilized with 125 ppm of BHT) at 150° C. on a Polymer Laboratories 220 instrument equipped with a set of three PLgel 10 µm mixed-B LS columns with differential refractive index and viscosity detectors. Molecular weights were determined by universal calibration relative to polystyrene standards. Laser desorption mass spectra were obtained with a Bruker Autoflex III Smartbeam time-of-flight MALDI mass spectrometer in reflectron mode using trans-2-[3-(4-tert-Butylphenyl)-2-methyl-2-propenylidene]malononitrile as matrix.

Example 1

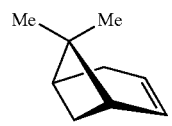

(1S)-6,6-Dimethylbicyclo[3.1.1]hept-2-ene (4)

(R)-Myrtenal (6, 97:3 er) (5.0 g, 33.3 mmol) and palladium (10%) on barium sulfate (600 mg) were combined in a flask and fitted with a Dean Stark apparatus. Mixture was heated to 185° C., affording the title compound (3.25 g, 26.6 mmol, 80% yield) in the Dean Stark trap as a clear oil: [α]$^{20}$D=−52.7 (c 3.1, CHCl$_3$); IR (film) 3036, 2988, 2914, 2831, 1365, 720, 688 cm$^{-1}$; $^1$H NMR (500 MHz, CDCl$_3$) δ=6.15 (ddt, 1H, J=8.4 6.5, 1.8 Hz), 5.54 (dtd, 1H, J=8.4, 2.9, 1.4 Hz), 2.37 (dt, 1H, J=8.5, 5.6 Hz), 2.34-2.22 (m, 2H), 2.15-2.08 (m, 2H), 1.27 (s, 3H), 1.20 (d, 1H, J=8.5 Hz), 0.89 (s, 3H); $^{13}$C NMR (125 MHz, CDCl$_3$): δ=136.5, 124.1, 41.9, 41.3, 38.0, 32.5, 32.1, 26.4, 21.3; HRMS (EI): Exact mass calcd for C$_9$H$_{14}$ [M+H]$^+$, 123.1168. Found 123.1181.

Example 2

Synthesis of [(H$_2$IMes)(3-Br-py)$_2$(Cl)$_2$Ru═CHPh] (10)

The Grubbs III catalyst 10 was prepared from Grubbs II (compounds 7-9 purchased from Sigma-Aldrich) according to the literature procedure, in good yield, as follows. 3-bromopyridine (0.57 mL, 5.9 mmol) was added to complex 7 (0.5 g, 0.59 mmol) in a 20 mL vial with a screw cap; no additional solvent is required. The reaction was stirred in air at room temperature for 5 minutes during which time a color change from red to bright green was observed. Room temperature pentane (20 mL) was added layered onto the green solution and a green solid began to precipitate. The vial was capped under air and cooled to ~5° C. overnight (freezer). The green precipitate was vacuum-filtered, washed with 4×10 mL of room temperature pentane, and dried under vacuum to afford 10 as a green powder. (See, Grubbs et al, *Angew. Chem. Int. Ed.*, 2002, 41, 4035-4037, and Supporting Information provided therewith.)

Example 3

General Procedure for ROMP of Apopinene (1S)-6,6 Dimethylbicyclo[3.1.1]hept-2-ene (4) (244.4 mg, 2 mmol) in THF (4 mL) was added via cannula to a flame dried flask charged with ruthenium catalyst (e.g. 10, 0.02 mmol), under N$_2$. After stirring for 1 hour at room temperature, ethyl vinyl ether (96 μL, 1 mmol) was added and stirred for 1 hour. The solvent was removed under reduced pressure and residue dissolved in DCM. Filtration through a pad of silica gel and removal of solvent under reduced pressure afforded the desired ring opening metathesis polymer as a plastic film.

Example 4

General Procedure for Ring-Opening Cross-Metathesis of Apopinene

A solution of (1S)-6,6-Dimethylbicyclo[3.1.1]hept-2-ene (4) (100 mg, 0.82 mmol) and styrene (13) (854 mg, 8.2 mmol) in THF (1.7 mL) was cannulated into a flask charged with Hoveyda-Grubbs II (9) (5.1 mg, 0.0082 mmol), under $N_2$. After 1 hour reaction was diluted with ether (wet) and solvent removed. Flash column chromatography afforded with hexanes as the eluent afforded the mixture of monosubstituted cross metathesis products as a clear oil (60 mg, 0.26 mmol, 32% yield). To a solution of the resulting mixture (40 mg, 0.18 mmol) in MeOH (0.5 mL) and hexanes (0.5 mL) was added Pd/C (8.0 mg, 0.008 mmol) and placed under an atmosphere of $H_2$. After 4 hours reaction was filtered over celite and the solvent removed under reduced pressure, affording a 4:1 mixture of 16 and 17, respectively (35 mg, 0.16 mmol, 88% yield).

1-((1R,3S)-3-allyl-2,2-dimethylcyclobutyl)ethan-1-one (S1)

To a solution of methyl triphenyl phosphonium bromide (850 mg, 2.38 mmol) in THF (12 mL), at −78° C., was added nBuLi (643 μL, 2.38 mmol, 1.85 M in hexanes). Reaction was warmed to room temperature for 1 hour and cannulated into a solution of pinonaldehyde (Barton, D. H. R.; Fontana, G., *Synth. Commun.* 1996, 26, 1953-1968) (400 mg, 2.38 mmol) in THF (12 mL) at −78° C., under $N_2$. Reaction was slowly warmed to room temperature overnight. After 12 hours resulting solution was cooled to 0° C. and quenched with $H_2O$ (25 mL). Resulting mixture was transferred to a separatory funnel and extracted with $Et_2O$ (3×25 mL). The combined organics were dried with $MgSO_4$ and the solvent was removed under reduced pressure. Flash column chromatography with 10% EtOAc in hexanes as the eluent afforded the title compound (220 mg, 1.33 mmol, 56% yield) as a clear oil: $[\alpha]^{20}D=-72.3$ (c 1.7, $CHCl_3$); IR (film) 2953, 1707, 1462, 1367, 1149 $cm^{-1}$; $^1H$ NMR (500 MHz, $CDCl_3$) δ=5.71 (td, 1H, J=11.1, 5.9 Hz), 5.01 (dd, 1H, J=17.1, 1.6 Hz), 4.94 (dt, 1H, J=10.2, 1.0 Hz), 2.82 (dd, 1H, J=9.9, 7.4 Hz), 2.04 (s, 3H), 2.11-1.83 (m, 6H), 1.30 (s, 3H), 0.88 (s, 3H); $^{13}C$ NMR (125 MHz, $CDCl_3$): δ=208.0, 136.8, 115.2, 54.2, 43.5, 41.4, 34.6, 30.6, 30.2, 23.1, 17.1; HRMS (ESI): Exact mass calcd for $C_{11}H_{19}O$ $[M+Na]^+$, 167.1430. Found 167.1437.

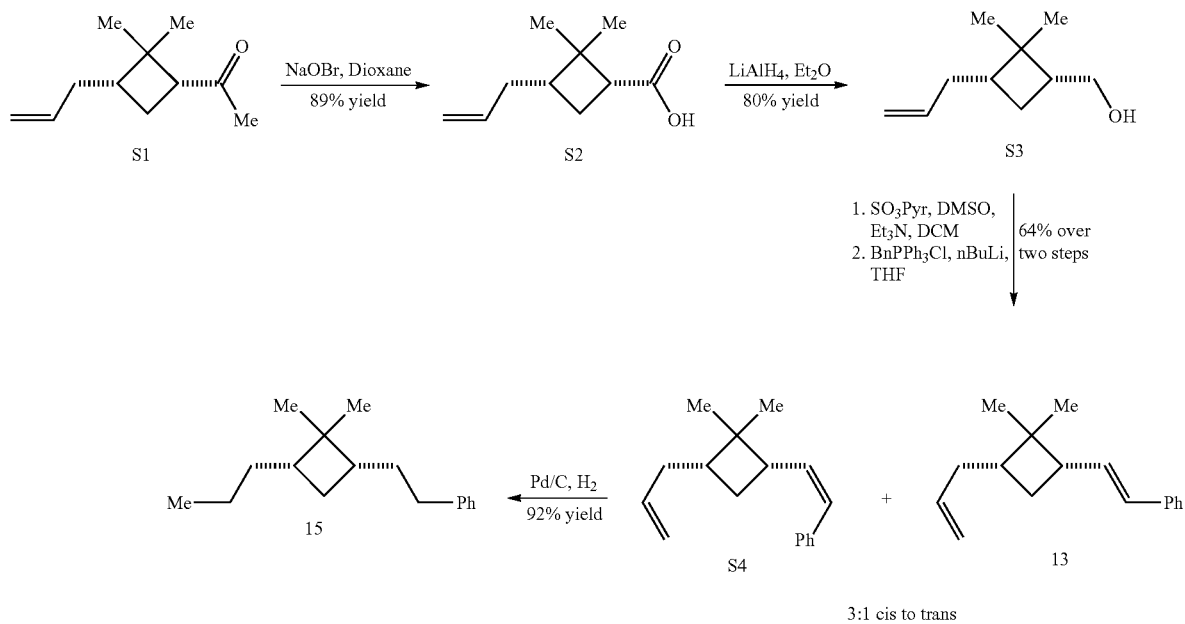

Scheme 4. Synthesis of cross-metathesis standard 16.

Example 5

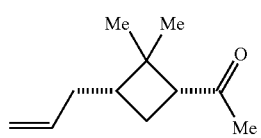

Example 6

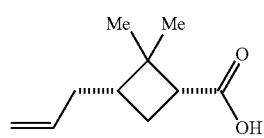

(1R,3S)-3-allyl-2,2-dimethylcyclobutane-1-carboxylic acid (S2)

NaOBr was prepared by slow addition of Br$_2$ (185 μg, 3.6 mmol) to a solution of NaOH (636 mg, 15.9 mmol) in H$_2$O (15.3 mL) at 0° C. Reaction was allowed to stir at room temperature for 30 min and cannulated into a solution of 1-((1R,3S)-3-allyl-2,2-dimethylcyclobutyl)ethan-1-one (S1) (200 mg, 1.2 mmol) at −15° C. Resulting mixture was allowed to warm to room temperature overnight. (Moglioni, A. G.; Garcia-Exposito, E.; Aguado, G. P.; Parella, T.; Branchadell, V.; Moltrasio, G. Y.; Ortuno, R. M., *J. Org. Chem.* 2000, 65, 3934-3940.) After 12 hours, reaction was diluted with H$_2$O (30 mL), transferred to a separatory funnel and extracted with DCM (1×25 mL). Aqueous phase was made strongly acidic with concentrated HCl (5 mL) and extracted with Et$_2$O (3×25 mL). The combined organics were washed with brine (100 mL) and dried over MgSO$_4$. Flash column chromatography with 50% EtOAc in hexanes as the eluent afforded the title compound (180 mg, 1.07 mmol, 89% yield) as a clear oil: [α]$^{20}$D=+17.0 (c 3.2, CHCl$_3$); IR (film) 2954, 1698, 1422, 1248, 911 cm$^{-1}$; $^1$H NMR (500 MHz, CDCl$_3$) δ=5.71 (td, 1H, J=11.1, 5.8 Hz, 1H), 5.02 (dt, 1H, J=17.1, 1.7 Hz), 4.97-4.94 (m, 1H), 2.73 (dd, 1H, J=10.4, 7.3 Hz), 2.16-2.11 (m, 1H), 2.06-1.98 (m, 3H), 1.91-1.86 (m, 1H), 1.23 (s, 3H), 1.02 (s, 3H); $^{13}$C NMR (125 MHz, CDCl$_3$): δ=177.9, 136.7, 115.3, 45.8, 43.1, 41.8, 34.9, 30.3, 24.3, 17.4 HRMS (ESI): Exact mass calcd for C$_{10}$H$_{16}$O$_2$ [M+Na]$^+$, 191.1043. Found 191.1035.

Example 7

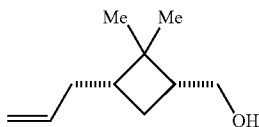

((1R,3S)-3-allyl-2,2-dimethylcyclobutyl)methanol (S3)

(1R,3S)-3-allyl-2,2-dimethylcyclobutane-1-carboxylic acid (S2) (130 mg, 0.77 mmol) in Et$_2$O (1.5 mL) was added to a solution of LiAlH$_4$ (88 mg, 2.3 mmol) in Et$_2$O (1.5 mL) at 0° C. under N$_2$. After stirring for 2 hours, the reaction was carefully quenched with saturated Na$_2$SO$_4$, until bubbling subsided. The reaction was warmed to room temperature and stirred for 30 minutes and filtered over celite. Concentration under reduced pressure and flash column chromatography on silica gel using 20% Et$_2$O in pentanes as the eluent afforded the title compound (82 mg, 0.62 mmol, 80% yield) as a clear oil: [α]$^{20}$D=+36.7 (c 1.6, CHCl$_3$); IR (film) 3327, 2955, 1640, 1463, 1008, 909 cm$^{-1}$; $^1$H NMR (500 MHz, CDCl$_3$) δ=5.74-5.67 (m, 1H), 4.99 (dq, 1H, J=17.1, 1.8 Hz), 4.93-4.90 (m, 1H), 3.64-3.61 (m, 1H), 3.53 (dd, 1H, J=10.8, 6.2 Hz), 2.14-2.09 (m, 1H), 2.06-1.86 (m, 4H), 1.19-1.17 (m, 1H), 1.11 (s, 3H), 1.05 (d, 1H, J=9.8 Hz), 0.97 (s, 3H); $^{13}$C NMR (125 MHz, CDCl$_3$): δ=137.3, 114.7, 63.9, 44.4, 41.7, 39.7, 34.9, 31.1, 26.3, 16.5; HRMS (ESI): Exact mass calcd for C$_{10}$H$_{18}$O [M+NH$_4$]$^+$, 172.1695. Found 172.1697.

Example 8

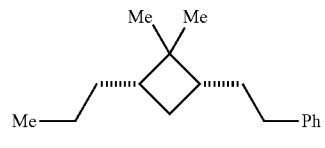 [SMILES: CCC[C@H]1C[C@@H](CCc2ccccc2)C1(C)C]

(2-((1R,3S)-2,2-dimethyl-3-propylcyclobutyl)ethyl)benzene (15)

To a solution of ((1R,3S)-3-allyl-2,2-dimethylcyclobutyl)methanol (S3) (17 mg, 0.11 mmol) in DCM (160 μL), Et$_3$N (77 μL), and DMSO (160 μL) at 0° C. was added SO$_3$ pyridine complex (50.2 mg, 0.33 mmol). Reaction was stirred for 4 hours and quenched with saturated NH$_4$Cl (1 mL). Resulting mixture was transferred to a separatory funnel and extracted with DCM (3×1 mL). The combined organics were dried over MgSO$_4$ and solvent removed under reduced pressure. To a solution of benzyl triphenyl phosphonium chloride (86 mg, 0.22 mmol) in THF (0.6 mL), at −78° C., was added nBuLi (108 μL, 0.2 mmol, 1.85 M in hexanes). Reaction was warmed to room temperature for 1 hour and cannulated into a solution of previously obtained residue in THF (0.6 mL) at −78° C., under N$_2$. Reaction was slowly warmed to room temperature overnight. After 12 hours resulting solution was cooled to 0° C. and quenched with H$_2$O (5 mL). Resulting mixture was transferred to a separatory funnel and extracted with Et$_2$O (3×5 mL). The combined organics were dried with MgSO$_4$ and the solvent was removed under reduced pressure. Flash column chromatography with hexanes as the eluent afforded the title compound (16 mg, 0.07 mmol, 64% yield) as a 3:1 mixture of cis- to trans-olefins ($^1$H- and $^{13}$C NMR spectra reported below). To a solution of ((Z)-2-((1S,3S)-3-allyl-2,2-dimethylcyclobutyl)vinyl)benzene (S4) and ((E)-2-((1S,3S)-3-allyl-2,2-dimethylcyclobutyl)vinyl)benzene (14) (25 mg, 0.11 mmol) in MeOH (0.5 mL) and hexanes (0.5 mL) was added Pd/C (7.6 mg, 0.008 mmol) and placed under an atmosphere of H$_2$. After 4 hours reaction was filtered over celite and the solvent removed under reduced pressure affording the title compound (24 mg, 0.10 mmol, 92% yield) as a clear oil: [α]$^{20}$=−3.2 (c 3.1, CHCl$_3$); IR (film) 2952, 2923, 1454, 745, 697 cm$^{-1}$; $^1$H NMR (500 MHz, CDCl$_3$) δ=7.28-7.25 (m, 2H), 7.18-7.15 (m, 3H), 2.49 (dt, 2H, J=9.6, 6.3 Hz), 2.01 (dt, 1H, J=10.3, 7.7 Hz), 1.78-1.71 (m, 2H), 1.64 (qd, 1H, J=6.5, 3.0 Hz), 1.48-1.44 (m, 1H), 1.30-1.07 (m, 5H), 1.03 (s, 3H), 0.88 (s, 3H), 0.87 (t, 3H, J=7.2 Hz); $^{13}$C NMR (125 MHz, CDCl$_3$): δ=143.1, 128.3, 128.2, 125.5, 42.6, 42.5, 39.9, 34.1, 32.6, 32.5, 30.6, 30.1, 20.9, 16.5, 14.4; HRMS (EI): Exact mass calcd for C$_{17}$H$_{26}$ [M]$^+$, 230.2035. Found 230.2028.

Scheme 5. Synthesis of cross-metathesis standard 17.

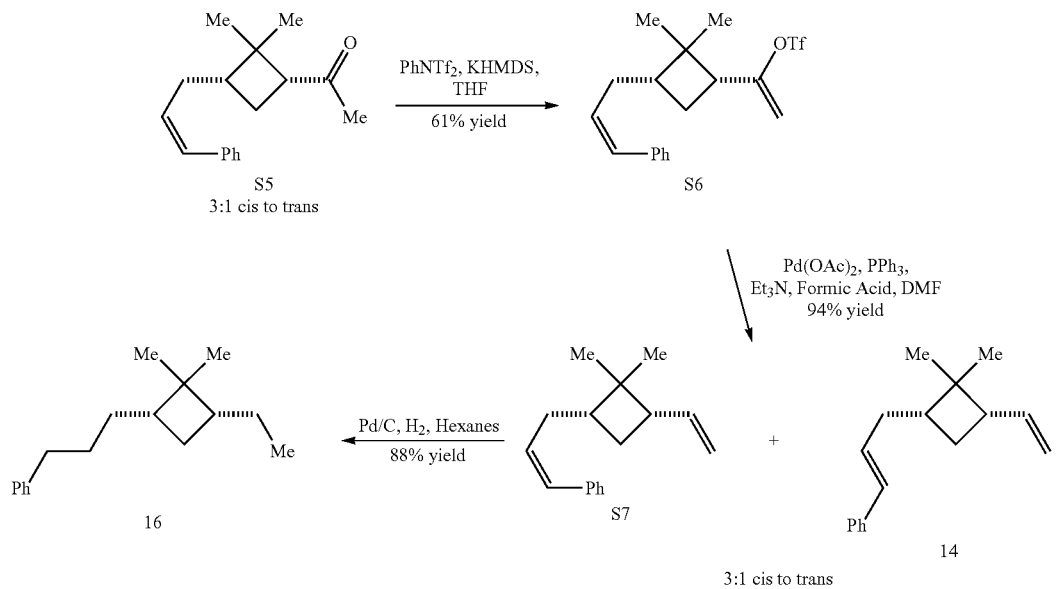

Example 9

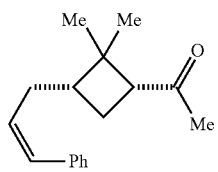 [SMILES: CC(=O)[C@@H]1C[C@H](C/C=C\c2ccccc2)C1(C)C]

30

1-(((1R,3S)-2,2-dimethyl-3-((Z)-3-phenylallyl)cyclobutyl)ethan-1-one (S5)

To a solution of benzyl triphenyl phosphonium chloride (463 mg, 1.19 mmol) in THF (6.0 mL), at −78° C., was added nBuLi (643 µL, 1.19 mmol, 1.85 M in hexanes). Reaction was warmed to room temperature for 1 hour and cannulated into a solution of pinonaldehyde[3] (200 mg, 1.19 mmol) in THF (6.0 mL) at −78° C., under $N_2$. Reaction was slowly warmed to room temperature overnight. After 12 hours resulting solution was cooled to 0° C. and quenched with $H_2O$ (5 mL). Resulting mixture was transferred to a separatory funnel and extracted with $Et_2O$ (3×5 mL). The combined organics were dried with $MgSO_4$ and the solvent was removed under reduced pressure. Flash column chromatography with 10% EtOAc in hexanes as the eluent afforded the title compound (201 mg, 83.3 mmol, 70% yield) as a 3:1 mixture of cis- to trans-olefins: $[α]^{20}D=−45.8$ (c 2.0, $CHCl_3$); IR (film) 2952, 1703, 1367, 1180, 964, 693 cm$^{-1}$; $^1H$ NMR (500 MHz, $CDCl_3$) δ=major signals reported 7.35-7.17 (m, 5H), 6.38 (d, 1H, J=15.7 Hz), 6.10 (dt, 1H, J=15.8, 7.0 Hz), 2.82 (td, 1H, J=10.1, 7.5 Hz), 2.28-2.22 (m, 1H), 2.04 (s, 3H), 2.16-1.85 (m, 4H), 1.32 (s, 3H), 0.92 (s, 3H); $^{13}C$ NMR (125 MHz, MeOD): δ=207.9, 137.7, 130.6, 128.7, 128.6, 1285, 128.1, 126.9, 125.9, 54.2 (0), 54.1 (9), 43.6, 41.8, 33.9, 30.6, 30.2, 23.1, 17.2; HRMS (ESI): Exact mass calcd for $C_{17}H_{22}O$ [M+Na]$^+$, 265.1563. Found 265.1566.

Example 10

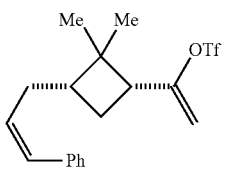 [SMILES: C=C(OS(=O)(=O)C(F)(F)F)[C@@H]1C[C@H](C/C=C\c2ccccc2)C1(C)C]

1-(((1R,3S)-2,2-dimethyl-3-((Z)-3-phenylallyl)cyclobutyl)vinyl trifluoromethanesulfonate (S6)

To a solution of 1-(((1R,3S)-2,2-dimethyl-3-((Z)-3-phenylallyl)cyclobutyl)ethan-1-one (S5) (300 mg, 1.24 mmol) in THF (5 mL) at −78° C. was added KHMDS (2.72 mL, 1.36 mmol, 0.5 M in toluene), under $N_2$. After 1 hour, N-phenyltriflimide (866 mg, 2.48 mmol) in THF (5.0 mL) was cannulated dropwise. The resulting mixture was warmed to 0° C. and diluted with $H_2O$ (10 mL) and transferred to a separatory funnel. The organic phase was collected and the aqueous layer extracted with $Et_2O$ (2×10 mL). The combined organics were dried with $Na_2SO_4$. Concentration under reduced pressure and flash column chromatography on silica gel in 1% $Et_2O$ in pentanes as the eluent afforded the title compound (281 mg, 0.76 mmol, 61% yield) as a 3:1 mixture of cis- to trans-olefins: $[α]^{20}D=+13.6$ (c 2.2, $CHCl_3$); IR (film) 2960, 1417, 1210, 903 cm$^{-1}$; $^1H$ NMR (500 MHz, $CDCl_3$) major signals reported δ=7.34-7.19 (m, 5H), 6.39 (d, 1H, J=15.8 Hz), 6.09 (dt, 1H, J=15.8, 6.9 Hz), 5.18 (dd, 1H, J=3.7, 0.7 Hz), 4.86 (dd, 1H, J=3.7, 1.5 Hz), 2.76-2.71 (m, 1H), 2.31-2.25 (m, 1H), 2.22-2.04 (m, 4H), 1.20 (s, 3H), 0.99 (s, 3H); $^{13}C$ NMR (125 MHz, $CDCl_3$): δ=157.6, 137.6, 130.7, 128.5, 128.1 (9), 128.1 (6), 127.0, 125.9, 103.6, 45.7, 42.3, 41.6, 33.8, 29.9, 26.7, 16.9; HRMS (EI): Exact mass calcd for $C_{18}H_{21}F_3O_3S$ [M+H]$^+$, 375.1236. Found 375.1209.

Example 11

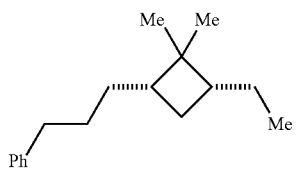 [SMILES: CC[C@@H]1C[C@H](CCCc2ccccc2)C1(C)C]

(3-((1S,3R)-3-ethyl-2,2-dimethylcyclobutyl)propyl)
benzene (16)

To a solution of 1-((1R,3S)-2,2-dimethyl-3-((Z)-3-phenylallyl)cyclobutyl)vinyl trifluoromethanesulfonate (S6) (83 mg, 0.22 mmol) in DMF (650 µL) was added Pd(OAc)$_2$ (1 mg, 0.004 mmol), PPh$_3$ (2.3 mg, 0.009 mmol), Et$_3$N (100 µL, 0.72 mmol), and formic acid (8 µL, 0.22 mmol). Reaction was heated to 60° C. for 1 hour. ((a) Cacchi, S.; Morera, E.; Ortar, G., Org. Synth. 1990, 68, 138-147; (b) van den Berg, R. J. B. H. N.; Korevaar, C. G. N.; van der Marel, G. A.; Overkleeft, H. S.; van Boom, J. H., Tetrahedron Lett. 2002, 43, 8409-8412.) At this time, reaction was cooled to room temperature and diluted with H$_2$O (2 mL). After transferring to a separatory funnel, resulting mixture was extracted with hexanes (3×2 mL). The combined organics were dried over MgSO$_4$ and solvent removed under reduced pressure. Flash column chromatography on silica gel with hexanes as the eluent afforded the title compound (47 mg, 0.21 mmol, 94% yield) as a 3:1 mixture of cis- to trans-olefins ($^1$H- and $^{13}$C NMR spectra reported below). To a solution of ((Z)-3-((1S,3S)-2,2-dimethyl-3-vinylcyclobutyl) prop-1-en-1-yl)benzene (S7) and ((E)-3-((1S,3S)-2,2-dimethyl-3-vinylcyclobutyl)prop-1-en-1-yl)benzene (15) (25 mg, 0.11 mmol) in MeOH (0.4 mL) and hexanes (0.4 mL) was added Pd/C (7.6 mg, 0.008 mmol) and placed under an atmosphere of H$_2$. After 12 hours reaction was filtered over celite and the solvent removed under reduced pressure affording the title compound (22 mg, 0.097 mmol, 88% yield) as a clear oil: [α]$^{20}$D=+10.9 (c 1.5, CHCl$_3$); IR (film) 2926, 2856, 1453, 745, 698 cm$^{-1}$; $^1$H NMR (500 MHz, CDCl$_3$) δ=7.29-7.26 (m, 2H), 7.17 (t, 3H, J=6.0 Hz), 2.58 (t, 2H, J=7.8 Hz), 1.99 (dd, 1H, J=10.3, 7.7 Hz), 1.76-1.69 (m, 1H), 1.66-1.59 (m, 1H), 1.54-1.46 (m, 2H), 1.40-1.31 (m, 2H), 1.27 (s, 1H), 1.23-1.12 (m, 2H), 1.02 (s, 3H), 0.84 (s, 3H), 0.78 (t, 3H, J=7.4 Hz); $^{13}$C NMR (125 MHz, MeOD): δ=143.0, 128.3, 128.2, 125.5, 44.8, 42.5, 39.9, 36.3, 30.8, 30.1, 29.7 (9), 29.7 (8), 23.3, 16.3, 12.1; HRMS (EI): Exact mass calcd for C$_{17}$H$_{26}$ [M-C$_4$H$_8$]$^+$, 174.1409. Found 174.1290.

Example 12

General Procedure for Post-Polymerization Epoxidation of Apopinene

To a stirred solution of the apopinene monomer (0.01 mmol) in DCM (20 mL) is added mCPBA (2 mmol). The mixture is stirred over at room temperature after which the mixture is diluted with DCM (20 mL) and washed with dilute sodium bisulfite solution (20 mL), then brine (20 mL). The organic layer is separated and solvent removed under reduced pressure. The crude material was purified by flash chromatography on silica gel to yield the product.

Example 13

General Procedure for Post-Polymerization Bromination of Apopinene

To a stirred solution of the apopinene polymer (0.01 mmol) in DCM (20 mL) is added bromine (2 mmol). The mixture is stirred over at room temperature after which the solvent is removed under reduced pressure. The crude material was purified by flash chromatography on silica gel to yield the product.

Example 14

General Procedure for Post-Polymerization Dihydroxylation of Apopinene

To a stirred solution of the apopinene polymer (0.01 mmol) in THF (20 mL), acetone (6 mL) and water (6 mL) is added N-methylmorpholine-N-oxide (2 mmol) and a solution of 2.5 wt % OsO$_4$ in t-BuOH (0.2 mmol). The mixture is stirred over at room temperature after which the mixture is diluted with brine (100 mL) and extracted with DCM (200 mL). The organic layer is dried over MgSO$_4$ and the solvent removed under reduced pressure to yield the modified polymer.

Example 15

General Procedure for Post-Polymerization Cross-Linking of Apopinene

The apopinene polymer (0.01 mmol) in DCM (10 mL) is treated with 1 drop of conc. H$_2$SO$_4$. The mixture is allowed to stir for 24 hours after which time the solvent is removed under reduced pressure to yield the newly derived polymeric material.

Example 16

General Procedure for Allylic Oxidation of Apopinene

Apopinene (2.0 mmol) is dissolved in DCM (4.0 mL). SeO$_2$ (2.0 mmol, 1.0 equiv.) is added to the flask, followed by 70 wt % in H$_2$O t BuOOH (4.0 equiv.) at room temperature. The mixture is sonicated for 3 minutes before being allowed to stir at room temperature for 24 hours. The reaction is then diluted with water and extracted with DCM. The combined organic layers are washed with brine, and then dried over MgSO$_4$. The crude material was purified by flash chromatography on silica gel to yield the product. This hydroxylated monomer can be utilized with ROMP or can be, for instance, reacted with an acid (e.g., an alkyl or aryl acid) to provide the corresponding ester for subsequent ROMP.

Example 17

General Procedure for ROMP of Functionalized Apopinene Monomers

The functionalized apopinene monomer (2 mmol) in THF (4 mL) is added via cannula to a flame dried flask charged with, as described above, ruthenium catalyst (0.02 mmol), under N$_2$. The mixture is stirred for 1 hour at room temperature after which time ethyl vinyl ether (96 µL, 1 mmol)

is added and stirring continued for 1 hour. The solvent is removed under reduced pressure and residue dissolved in DCM. Filtration through a pad of silica gel and removal of solvent under reduced pressure affords the desired ring opening metathesis polymer.

Example 18

With reference to Example 2, above, it will be understood by those skilled in the art that various metathesis catalysts and related ligand components can be utilized to provide stereo- and/or regioselective for ROMP and with respect to the resulting polymers. Without limitation, a range of such catalysts and ligands are described in Grubbs, et al., supra, and Chapter 8.5.3 of Handbook of Ring-Opening Polymerization. Edited by P. Dubois, O. Coulembier, and J.-M Raquez Copyright © 2009 WILEY-VCH Verlag GmbH & Co. KGaA, Weinheim, ISBN: 978-3-527-31953-4, each of which is incorporated herein by reference in its entirety.

As demonstrated, the ring-opening metathesis polymerization of apopinene is available through use of the present invention. Apopinene reacts, for instance, with Ru-based metathesis catalysts to provide an all trans-polymer with a polydispersity index (PDI) as low as 1.6 and molecular weights in the 1100 to 15600 g·mol$^{-1}$ range (9-127 monomer units). Because apopinene is readily prepared in one-step from myrtenal or two-steps from α-pinene, both of which are commercially available and naturally abundant, these studies indicate that apopinene can be used as a new biorenewable precursor for the sustainable production of ROMP-based materials.

We claim:

1. A method of using a pinene derivative for ring-opening metathesis polymerization, said method comprising:
    providing starting material comprising an apopinene monomer component; and
    reacting said starting material with a metathesis catalyst component under reaction conditions promoting ring-opening metathesis polymerization of said starting material, to provide a polyalkene product.

2. The method of claim 1 wherein the metal center of said metathesis catalyst component is selected from Re, Ru, Mo or W.

3. The method of claim 2 wherein said metal center is Ru.

4. The method of claim 3 wherein said metathesis catalyst component is selected from Ru-based Grubbs catalysts.

5. The method of claim 4 wherein said metathesis catalyst component is a Grubbs III catalyst.

6. The method of claim 5 wherein said metathesis catalyst component is regioselective for said apopinene monomer component.

7. The method of claim 1 wherein said reacting is carried out is in a solvent.

8. The method of claim 7 wherein said solvent is selected from benzene, dichloromethane or tetrahydrofuran.

9. The method of claim 8 wherein said solvent is tetrahydrofuran.

10. The method of claim 1 wherein said apopinene monomer component is selected from apopinene or apopinene comprising an allylic functional group, wherein said allylic functional group is selected from OH, or RC(O)O, where R is selected from alkyl, substituted alkyl, aryl or substituted aryl moieties, said substituents are selected from hydroxy, amino, halo, $C_1$-$C_6$ alkyl and $C_1$-$C_6$ alkoxy substituents, or combinations thereof.

11. The method of claim 10 wherein R is selected from $C_1$-$C_6$ alkyl or phenyl moieties.

12. The method of claim 1 comprising further reaction of a carbon-carbon double bond of said polyalkene product.

13. The method of claim 12 wherein said further reaction is selected from hydrogenation, halogenation, dihydroxylation, epoxidation, or cross-linkage of said polyalkene product.

14. A method of preparing a polymer of apopinene, said method comprising:
    providing a fluid medium comprising an apopinene monomer component;
    contacting such a medium with a metathesis catalyst component; and
    reacting said apopinene monomer component with said metathesis catalyst component under conditions promoting ring-opening metathesis polymerization, to provide a polyalkene product.

15. The method of claim 14 wherein the metal center of said metathesis catalyst component is selected from Re, Ru, Mo and W.

16. The method of claim 15 wherein said metal center is Ru.

17. The method of claim 16 wherein said metathesis catalyst component is selected from Ru-based Grubbs catalysts.

18. The method of claim 17 wherein said metathesis catalyst component is a Grubbs III catalyst.

19. The method of claim 14 wherein said fluid medium comprises a solvent selected from benzene, dichloromethane or tetrahydrofuran.

20. The method of claim 19 wherein said solvent is tetrahydrofuran.

21. The method of claim 14 wherein said apopinene monomer component is selected from apopinene or apopinene comprising an allylic functional group, wherein said allylic functional group is selected from OH, or RC(O)O, where R is selected from alkyl, substituted alkyl, aryl or substituted aryl moieties, and substituents are selected from hydroxy, amino, halo, $C_1$-$C_6$ alkyl and $C_1$-$C_6$ alkoxy substituents, or combinations thereof.

22. The method of claim 21 wherein R is selected from $C_1$-$C_6$ alkyl or phenyl moieties.

23. The method of claim 14 comprising further reaction of a carbon-carbon double bond of said polyalkene product.

24. The method of claim 23 wherein said further reaction is selected from hydrogenation, halogenation, dihydroxylation, epoxidation, or cross-linkage of said polyalkene product.

25. A polymer comprising a ring-opening polymerization product of an apopinene monomer component, said polymer comprising cis-configured monomeric linkages, trans-configured monomeric linkages and combinations thereof.

26. The polymer of claim 25 wherein said apopinene monomer component is selected from apopinene or apopinene comprising an allylic functional group, wherein said allylic functional group is selected from OH, or RC(O)O, where R is selected from alkyl, substituted alkyl, aryl or substituted aryl moieties, and substituents are selected from hydroxy, amino, halo, $C_1$-$C_6$ alkyl, $C_1$-$C_6$ alkoxy substituents, or combinations thereof.

27. The polymer of claim 25 wherein R is selected from $C_1$-$C_6$ alkyl or phenyl moieties.

28. The polymer of claim 25 wherein a carbon-carbon double bond of said polymer is transformed.

29. The polymer of claim 28 wherein transformation of said polymer is selected from hydrogenation, halogenation, dihydroxylation, epoxidation, or cross-linkage of said polymer.

30. The polymer of claim 25 comprising solely unfunctionalized apopinene monomer components.

31. The polymer of claim 25 wherein all carbon-carbon double bonds have a trans-configuration.

* * * * *